J. M. BELL.
APPARATUS FOR SOLDERING AND WELDING JOINTS.
APPLICATION FILED MAY 12, 1916.

1,203,465.

Patented Oct. 31, 1916.

Inventor
John M. Bell

By H. R. Van Deventer
Attorney

UNITED STATES PATENT OFFICE.

JOHN MONTGOMERY BELL, OF CHESTER, SOUTH CAROLINA.

APPARATUS FOR SOLDERING AND WELDING JOINTS.

1,203,465.  Specification of Letters Patent.  Patented Oct. 31, 1916.

Application filed May 12, 1916. Serial No. 97,033.

*To all whom it may concern:*

Be it known that I, JOHN MONTGOMERY BELL, a citizen of the United States, residing at Chester, in the county of Chester and State of South Carolina, have invented certain new and useful Improvements in Apparatus for Soldering and Welding Joints, of which the following is a specification, reference being had to the accompanying drawing.

This invention relates to means for soldering or welding joints, particularly joints in telephone, telegraph or power wires and consists of an improved method of applying the molten metal to the joints, whereby a better joint is obtained than by other methods.

A further object is to eliminate the waste of material, occurring when other methods such as a hot iron or blow torch applied directly to the joint is used.

A further object is to provide means positioned about the joint, enabling the joint to be incased within the solder, a very desirable feature when iron and copper wires are joined, as the complete coating of solder eliminates electrolytic action in the joint.

The construction of an apparatus embodying my invention may be varied within wide limits. For the sake of illustration I will describe an apparatus suitable for joining wires in a horizontal position. The modification necessary in an apparatus adapted for joining wires in a vertical position will be obvious.

Figure 1:
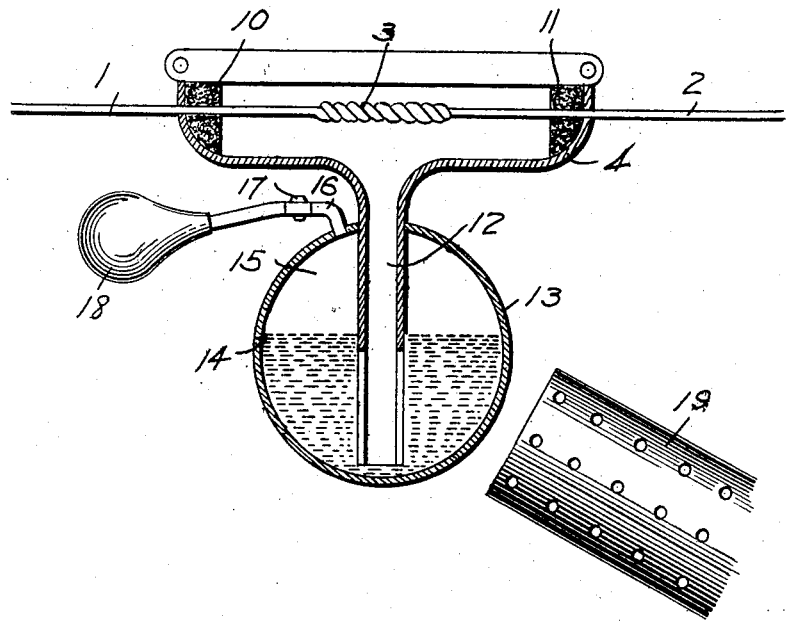
Figure 2:
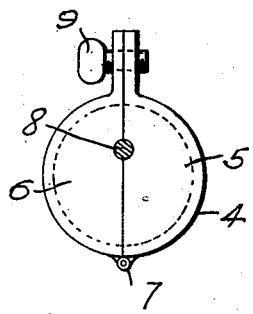

In the accompanying drawing, Figure 1, is a view partly in section and in the nature of a diagram embodying my invention. Fig. 2, is an end view of the solder receptacle.

The numerals 1 and 2, denote the wires to be joined and the splice 3, is made in the usual manner. After the wires have been suitably cleaned and twisted together and the flux applied, the solder receptacle 4, is placed about them. This consists of a split casing, the two portions of which are indicated at 5 and 6. These are hinged or connected in any suitable manner at 7. Each end has an aperture indicated at 8 of the proper size to admit the wires. The casing may be secured together by suitable thumb screws 9. As a further precaution against the molten solder leaking out at each end of the receptacle, some asbestos wool may be packed at each end of the receptacle, as indicated at 10 and 11. The receptacle 4 has a downwardly projecting tube 12 communicating with the reservoir 13, which may be partially filled, for instance up to the line 14, with suitable solder. An air space 15, exists above the solder. Communicating with this air space is a tube 16 having a suitable check valve therein, indicated at 17 and connected with a force bulb or pump 18. The outfit being applied to the joint to be soldered, and clamped thereto, the reservoir 13 is heated by any suitable means, such as by the blow torch 19, and as soon as the solder within said reservoir is in a fluid condition, air pressure is applied to the same by means of the bulb or pump 18, thereby forcing the solder up the tube 12 and into the receptacle 4 and about the joint.

If it is desirable to completely inclose the joint with solder, the entire reservoir is filled, after which the thumb screws 9 are loosened, the receptacle opened, and the downwardly projecting stem formed by the metal in 12 broken off, thereby leaving the joint complete.

If it is not desirable to completely inclose the joint, but merely to solder the same, then the solder when in a molten condition is allowed to drain off the joint and return to the reservoir 13. It will be obvious that the joint and the casing 4 may be heated to facilitate this draining back of the molten metal.

It will be obvious that this device is easily and quickly applied to joints and eliminates the danger of a poor connection, which commonly occurs from the use of a cold soldering iron or from the blackening of the joint, when a directly applied flame is used. It is also obvious that the device may readily be carried from place to place, as for instance along a telegraph line when same is in process of erection and that very little time will be lost in making joints and the loss of metal entirely eliminated.

Having thus described my invention, I claim:

1. Apparatus for making soldered connections comprising a receptacle about the parts to be soldered, a closed reservoir, a connection between said receptacle and reservoir, and means for applying air pressure to said reservoir and thereby forcing the contents thereof into said receptacle and about said parts.

2. Apparatus for soldering joints comprising a receptacle adapted to be positioned about said joints, a closed reservoir of molten metal connected therewith, and means for applying air pressure to said metal whereby it is caused to flow into said receptacle and about said joints, as and for the purpose specified.

In testimony whereof I hereunto affix my signature in the presence of two witnesses.

JOHN MONTGOMERY BELL.

Witnesses:
R. B. CALDWELL,
R. C. GAGE.

Copies of this patent may be obtained for five cents each, by addressing the "Commissioner of Patents, Washington, D. C."